(12) United States Patent
Seok

(10) Patent No.: US 10,660,096 B2
(45) Date of Patent: *May 19, 2020

(54) METHOD AND DEVICE FOR IDENTIFYING BASIC SERVICE SET

(71) Applicant: TECHFLUX, LTD., Seojong-si (KR)

(72) Inventor: Yong H Seok, Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/671,508

(22) Filed: Aug. 8, 2017

(65) Prior Publication Data

US 2017/0359825 A1 Dec. 14, 2017

Related U.S. Application Data

(63) Continuation of application No. 15/390,603, filed on Dec. 26, 2016, now Pat. No. 9,730,226, which is a continuation of application No. PCT/IB2015/001268, filed on Jun. 26, 2015.

(30) Foreign Application Priority Data

Jun. 27, 2014 (KR) .................. 10-2014-0080170

(51) Int. Cl.
| | |
|---|---|
| *H04W 72/04* | (2009.01) |
| *H04L 29/12* | (2006.01) |
| *H04L 27/26* | (2006.01) |
| *H04W 84/12* | (2009.01) |

(52) U.S. Cl.
CPC ..... *H04W 72/0453* (2013.01); *H04L 61/6081* (2013.01); *H04L 27/2601* (2013.01); *H04W 84/12* (2013.01)

(58) Field of Classification Search
CPC ............. H04L 27/0006; H04L 27/2601; H04L 61/6081; H04W 72/0453; H04W 74/0816; H04W 84/12

See application file for complete search history.

(56) References Cited

U.S. PATENT DOCUMENTS

| | | |
|---|---|---|
| 7,054,296 B1 | 5/2006 | Sorrells et al. |
| 8,363,578 B1 | 1/2013 | Ramamurthy et al. |
| 8,923,146 B2 | 12/2014 | Ong et al. |
| 8,942,123 B2 | 1/2015 | Merlin et al. |
| 8,964,618 B2 | 2/2015 | Seok |
| 9,107,229 B2 | 8/2015 | Choudhury et al. |
| 2004/0103278 A1 | 5/2004 | Abhishek et al. |
| 2006/0105370 A1 | 5/2006 | Ghazala et al. |
| 2006/0251032 A1 | 11/2006 | Roy et al. |
| 2008/0192644 A1 | 8/2008 | Utsunomiya et al. |
| 2011/0013575 A1 | 1/2011 | Liao et al. |
| 2011/0013721 A1 | 1/2011 | Liao et al. |

(Continued)

FOREIGN PATENT DOCUMENTS

| | | |
|---|---|---|
| CN | 101164354 | 4/2008 |
| CN | 104050471 | 9/2014 |

(Continued)

*Primary Examiner* — Yong Hang Jiang

(57) ABSTRACT

A method for accessing a channel in a wireless local area network is provided. An access station receives a physical layer protocol data unit (PPDU) in a channel. The access station determines a Clear Channel Assessment (CCA) sensitivity level based on a basic service set for the received PPDU and determines whether the channel is idle or busy based on the determined CCA sensitivity level.

12 Claims, 10 Drawing Sheets

(56) References Cited

U.S. PATENT DOCUMENTS

| | | | |
|---|---|---|---|
| 2012/0063335 A1* | 3/2012 | Cho | H04W 8/186 370/252 |
| 2013/0128831 A1* | 5/2013 | Calcev | H04W 72/042 370/329 |
| 2014/0328270 A1 | 11/2014 | Zhu et al. | |
| 2015/0110093 A1 | 4/2015 | Asterjadhi et al. | |
| 2015/0203820 A1 | 7/2015 | Wang et al. | |
| 2015/0228004 A1 | 8/2015 | Kaye et al. | |
| 2015/0264617 A1 | 9/2015 | Choudhury et al. | |
| 2015/0282043 A1 | 10/2015 | Fang et al. | |
| 2015/0312386 A1* | 10/2015 | Lee | H04L 69/22 370/338 |
| 2015/0312941 A1 | 10/2015 | Oh et al. | |
| 2015/0327276 A1 | 11/2015 | Rebeiz et al. | |
| 2015/0358904 A1 | 12/2015 | Kwon et al. | |
| 2015/0365973 A1 | 12/2015 | Choi et al. | |
| 2016/0056929 A1 | 2/2016 | Kwon | |
| 2016/0080954 A1 | 3/2016 | Hedayat | |
| 2016/0135225 A1 | 5/2016 | Kwon et al. | |
| 2016/0143058 A1 | 5/2016 | Son et al. | |
| 2016/0150534 A1* | 5/2016 | Kwon | H04W 72/0446 370/338 |
| 2016/0174079 A1 | 6/2016 | Wang et al. | |
| 2016/0174254 A1 | 6/2016 | Hedayat | |
| 2016/0186263 A1 | 6/2016 | Lindsay et al. | |
| 2016/0242070 A1* | 8/2016 | Asterjadhi | H04L 5/0055 |
| 2016/0249397 A1* | 8/2016 | Seok | H04W 74/0808 |
| 2016/0330788 A1 | 11/2016 | Zheng et al. | |
| 2016/0353329 A1 | 12/2016 | Kakani | |

FOREIGN PATENT DOCUMENTS

| | | |
|---|---|---|
| CN | 104219559 A | 12/2014 |
| CN | 104299197 | 1/2015 |
| CN | 104333858 | 2/2015 |
| CN | 104936517 A | 9/2015 |
| CN | 104937586 A | 9/2015 |
| CN | 105190659 A | 12/2015 |
| EP | 01424829 A2 | 6/2004 |
| EP | 2863607 A2 | 4/2015 |
| EP | 02930997 A1 | 10/2015 |
| EP | 02966789 A1 | 1/2016 |
| JP | 2016502517 A | 1/2016 |
| JP | 2016509206 A | 3/2016 |
| KR | 20150119175 A | 2/2014 |
| KR | 20150085814 A | 7/2015 |
| KR | 20150122198 A | 10/2015 |
| WO | WO-2006049709 A2 | 5/2006 |
| WO | WO-2011060326 A1 | 5/2011 |
| WO | WO-2013074917 A1 | 5/2013 |
| WO | WO-2015065112 A1 | 5/2015 |

\* cited by examiner

| L-STF | L-LTF | L-SIG | HEW-SIGA | HEW-STF (+1) | HEW-LTF (+1) | HEW-LTF (+1) | ... | HEW-SIGB (+1) |
| | | | | HEW-STF (-1) | HEW-LTF (-1) | HEW-LTF (-1) | ... | HEW-SIGB (-1) |
| | | | | HEW-STF (-1) | HEW-LTF (-1) | HEW-LTF (-1) | ... | HEW-SIGB (-1) |
| | | | | HEW-STF (-1) | HEW-LTF (-1) | HEW-LTF (-1) | ... | HEW-SIGB (-1) |

FIG. 5

| L-STF (+j) | L-LTF (+j) | L-SIG (+j) | HEW-SIGA (+j) | HEW-STF (-1) | HEW-LTF (-1) | HEW-LTF (-1) | ...... | HEW-SIGB(-1) |
|---|---|---|---|---|---|---|---|---|
| | | | | HEW-STF (-1) | HEW-LTF (-1) | HEW-LTF (-1) | ...... | HEW-SIGB(-1) |
| | | | | HEW-STF (-1) | HEW-LTF (-1) | HEW-LTF (-1) | ...... | HEW-SIGB(-1) |
| | | | | HEW-STF (+1) | HEW-LTF (+1) | HEW-LTF (+1) | ...... | HEW-SIGB(+1) |
| L-STF (+1) | L-LTF (+1) | L-SIG (+1) | HEW-SIGA (+1) | HEW-STF (-1) | HEW-LTF (-1) | HEW-LTF (-1) | ...... | HEW-SIGB(-1) |
| | | | | HEW-STF (-1) | HEW-LTF (-1) | HEW-LTF (-1) | ...... | HEW-SIGB(-1) |
| | | | | HEW-STF (-1) | HEW-LTF (-1) | HEW-LTF (-1) | ...... | HEW-SIGB(-1) |
| | | | | HEW-STF (+1) | HEW-LTF (+1) | HEW-LTF (+1) | ...... | HEW-SIGB(+1) |

FIG. 6

| | | | | HEW-STF (-1) | HEW-LTF (-1) | HEW-LTF (-1) | ..... | HEW-SIGB(-1) |
|---|---|---|---|---|---|---|---|---|
| L-STF (-1) | L-LTF (-1) | L-SIG (-1) | HEW-SIGA (-1) | HEW-STF (-1) | HEW-LTF (-1) | HEW-LTF (-1) | ..... | HEW-SIGB(-1) |
| | | | | HEW-STF (-1) | HEW-LTF (-1) | HEW-LTF (-1) | ..... | HEW-SIGB(-1) |
| | | | | HEW-STF (+1) | HEW-LTF (+1) | HEW-LTF (+1) | ..... | HEW-SIGB(+1) |
| | | | | HEW-STF (-1) | HEW-LTF (-1) | HEW-LTF (-1) | ..... | HEW-SIGB(-1) |
| L-STF (-1) | L-LTF (-1) | L-SIG (-1) | HEW-SIGA (-1) | HEW-STF (-1) | HEW-LTF (-1) | HEW-LTF (-1) | ..... | HEW-SIGB(-1) |
| | | | | HEW-STF (-1) | HEW-LTF (-1) | HEW-LTF (-1) | ..... | HEW-SIGB(-1) |
| | | | | HEW-STF (+1) | HEW-LTF (+1) | HEW-LTF (+1) | ..... | HEW-SIGB(+1) |
| | | | | HEW-STF (-1) | HEW-LTF (-1) | HEW-LTF (-1) | ..... | HEW-SIGB(-1) |
| L-STF (-1) | L-LTF (-1) | L-SIG (-1) | HEW-SIGA (-1) | HEW-STF (-1) | HEW-LTF (-1) | HEW-LTF (-1) | ..... | HEW-SIGB(-1) |
| | | | | HEW-STF (-1) | HEW-LTF (-1) | HEW-LTF (-1) | ..... | HEW-SIGB(-1) |
| | | | | HEW-STF (+1) | HEW-LTF (+1) | HEW-LTF (+1) | ..... | HEW-SIGB(+1) |
| | | | | HEW-STF (-1) | HEW-LTF (-1) | HEW-LTF (-1) | ..... | HEW-SIGB(-1) |
| L-STF (+1) | L-LTF (+1) | L-SIG (+1) | HEW-SIGA (+1) | HEW-STF (-1) | HEW-LTF (-1) | HEW-LTF (-1) | ..... | HEW-SIGB(-1) |
| | | | | HEW-STF (-1) | HEW-LTF (-1) | HEW-LTF (-1) | ..... | HEW-SIGB(-1) |
| | | | | HEW-STF (+1) | HEW-LTF (+1) | HEW-LTF (+1) | ..... | HEW-SIGB(+1) |

FIG. 7

METHOD AND DEVICE FOR IDENTIFYING BASIC SERVICE SET

CROSS-REFERENCE TO RELATED APPLICATIONS

The present application is a continuation application of a currently pending U.S. application Ser. No. 15/390,603 having a U.S. filing date of Dec. 26, 2016. The U.S. application Ser. No. 15/390,603 is a Continuation Application (Bypass Continuation Application) of international application No. PCT/IB2015/001268 having an international filing date of Jun. 26, 2015 and designating the United States, the international application claiming priority to the following earlier filed Korean patent application No. 10-2014-0080170 filed on Jun. 27, 2014. The entire contents of all of these prior applications are incorporated herein by reference. The applicant claims the benefit of and claims priory herein to all of these applications and their filing dates and priority dates.

BACKGROUND OF THE INVENTION

Field of the Invention

The present invention relates to wireless communications, and more particularly, to a method for channel access in a wireless communication and a device using the same.

Related Art

Institute of Electrical and Electronics Engineers (IEEE) 802.11n standard established in 2009 provides a transfer rate of up to 600 Mbps at a frequency band of 2.4 GHz or 5 GHz on the basis of Multiple Input Multiple Output (MIMO) technique.

IEEE 802.11ac standard established in 2013 aims to provide a throughput greater than or equal to 1 Gbps utilizing Medium Access Control (MAC) Service Access Point (SAP) layer scheme at a frequency band less than or equal to 6 GHz. A system supporting IEEE 802.11ac standard is referred to as a Very High Throughput (VHT) system.

There are continuing efforts to implement more effective Wireless Local Area Network (WLAN) technologies in increasingly congested environments.

SUMMARY OF THE INVENTION

The present invention provides a method for accessing a channel in a wireless local area network.

The present invention also provides a device for accessing a channel in a wireless local area network.

In an aspect, a method for accessing a channel in a wireless local area network is provided. The method includes receiving, by an access station, a physical layer protocol data unit (PPDU) in a channel, determining, by the access station, a Clear Channel Assessment (CCA) sensitivity level based on a basic service set for the received PPDU, and determining, by the access station, whether the channel is idle or busy based on the determined CCA sensitivity level.

Determining the CCA sensitivity level may include, if the received PPDU is transmitted by a first station belonging to a BSS of the access station, determining the CCA sensitivity level as a first threshold, and if the received PPDU is transmitted by a second station not belonging to a BSS of the access station, determining the CCA sensitivity level as a second threshold.

The second threshold may be greater than the first threshold.

In another aspect, a device configured for bandwidth signaling in a wireless local area network is provided. The device includes a radio frequency module configured to transmit and receive radio signals and a processor operatively coupled with the radio frequency module and configured to instruct the radio frequency module to receive a physical layer protocol data unit (PPDU) in a channel, determine a Clear Channel Assessment (CCA) sensitivity level based on a basic service set for the received PPDU, and determine whether the channel is idle or busy based on the determined CCA sensitivity level.

A coverage of a basic service set (BSS) can be increased. A station can identify its BSS when a plurality of BSSs coexists.

BRIEF DESCRIPTION OF THE DRAWINGS

FIG. 5 shows an HEW PPDU format in a 20 MHz channel.
FIG. 6 shows an HEW PPDU format in a 40 MHz channel.
FIG. 7 shows an HEW PPDU format in an 80 MHz channel.

DESCRIPTION OF EXEMPLARY EMBODIMENTS

The proposed wireless local area network (WLAN) system may operate at a band less than or equal to 6 GHz or at a band of 60 GHz. The operating band less than or equal to 6 GHz may include at least one of 2.4 GHz and 5 GHz.

For clarity, a system complying with the Institute of Electrical and Electronics Engineers (IEEE) 802.11 a/g standard is referred to as a non-High Throughput (non-HT) system, a system complying with the IEEE 802.11n standard is referred to as a High Throughput (HT) system, and a system complying with IEEE 802.11ac standard is referred to as a Very High Throughput (VHT) system. In comparison thereto, a WLAN system complying with the proposed method is referred to as a High Efficiency WLAN (HEW) system. A WLAN system supporting systems used before the HEW system is released is referred to as a legacy system. The HEW system may include an HEW Station (STA) and an HEW Access Point (AP). The term HEW is only for the purpose of distinguishing from the conventional WLAN, and there is no restriction thereon. The HEW system may support IEEE 802.11/a/g/n/ac by providing backward compatibility in addition to the proposed method.

Hereinafter, unless a function of a station (STA) is additionally distinguished from a function of an Access Point (AP), the STA may include a non-AP STA and/or the AP. When it is described as an STA-to-AP communication, the STA may be expressed as the non-AP STA, and may correspond to communication between the non-AP STA and the AP. When it is described as STA-to-STA communication or when a function of the AP is not additionally required, the STA may be the non-AP STA or the AP.

A Physical layer Protocol Data unit (PPDU) is a data unit for data transmission.

Figure 1:
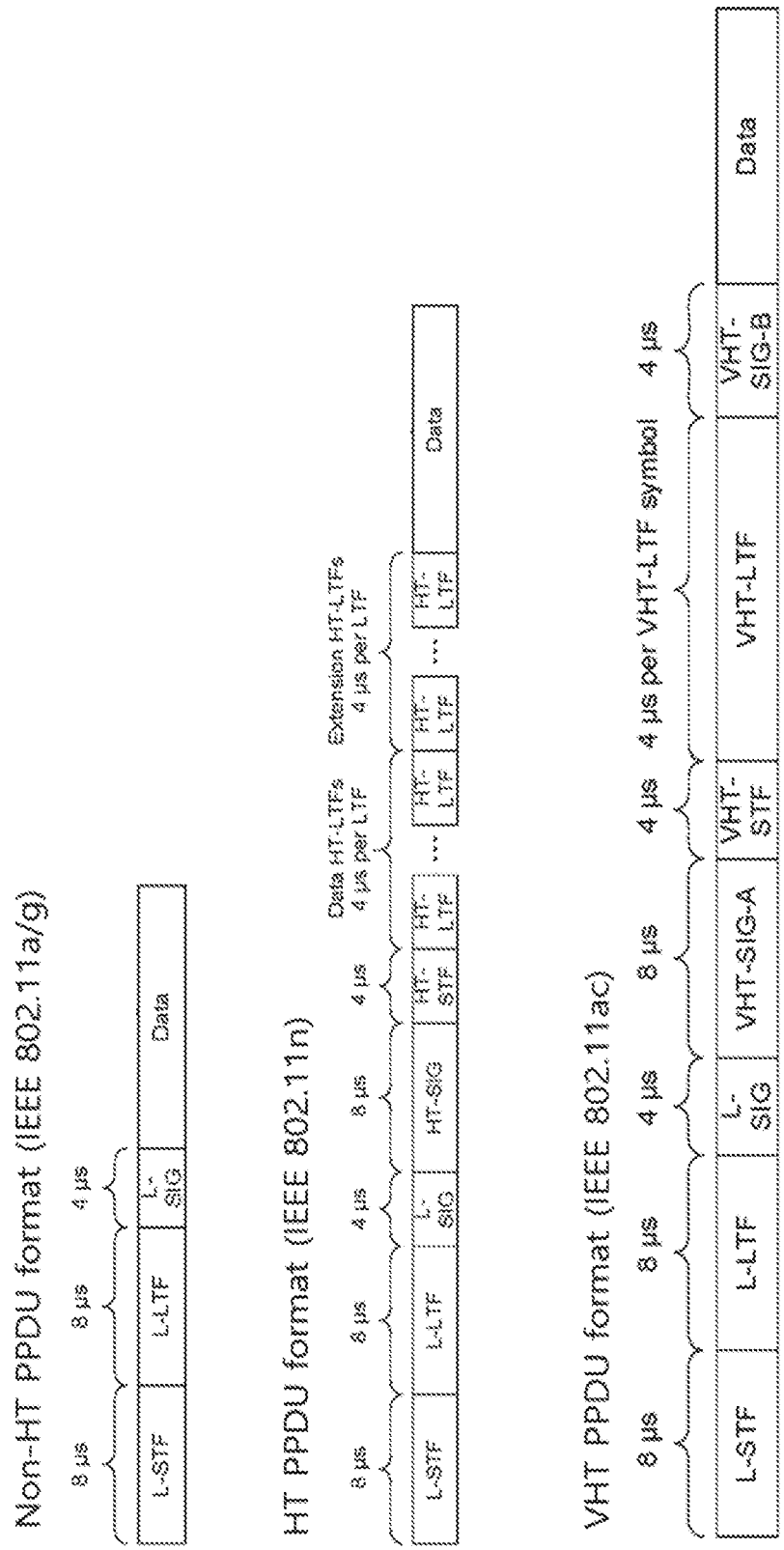
FIG. 1 shows PPDU formats used by the legacy system.

FIG. 1 shows PPDU formats used by the legacy system.

A non-HT PPDU supporting IEEE 802.11a/g includes a Legacy-Short Training Field (L-STF), a Legacy-Long Training Field (L-LTF), and a Legacy-Signal (L-SIG).

An HT PPDU supporting IEEE 802.11n includes a HT-SIG, a HT-STF, and a HT-LTF after the L-SIG.

A VHT PPDU supporting IEEE 802.11ac includes a VHT-SIG-A, a VHT-STF, a VHT-LTF, and a VHT-SIG-B after the L-SIG.

Figure 2:
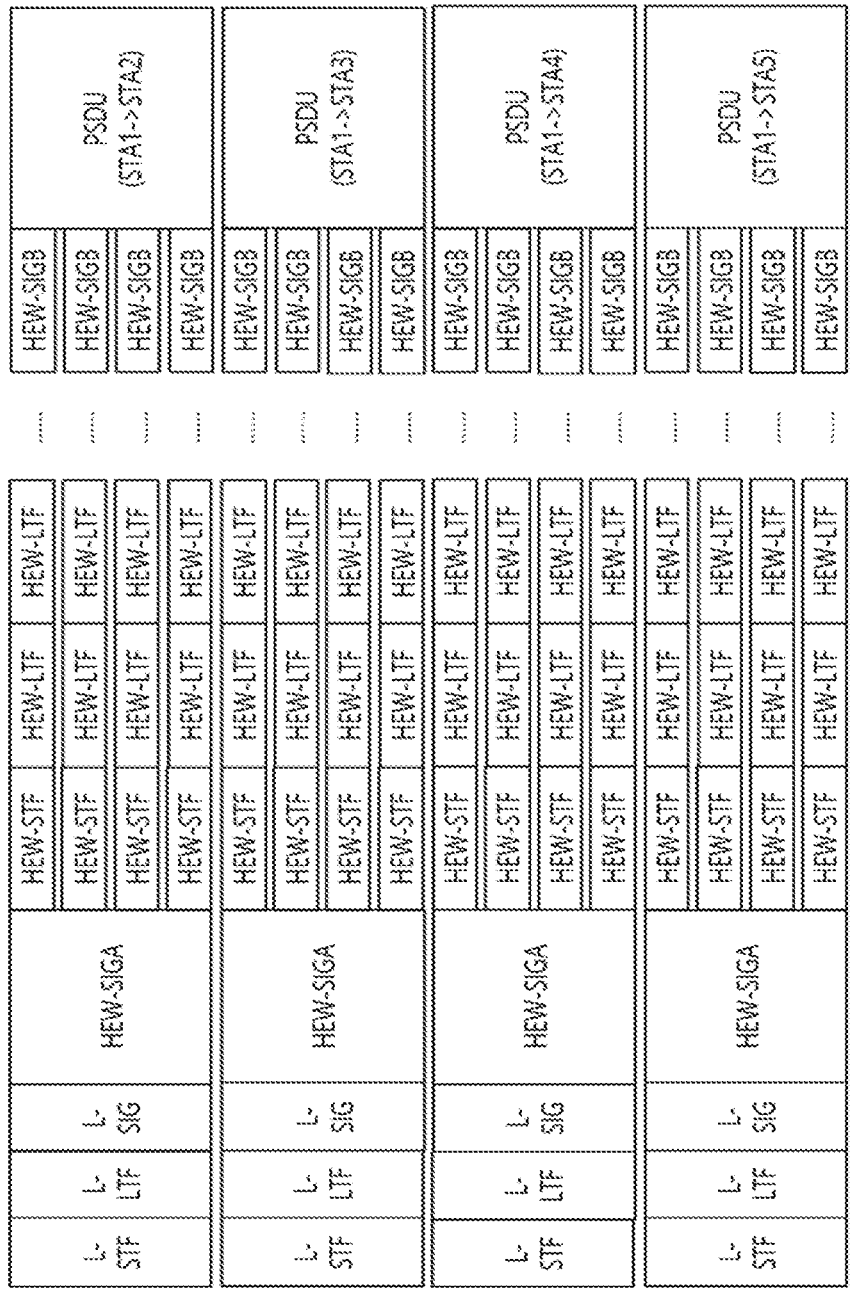
FIG. 2 shows an HEW PPDU format according to an embodiment of the present invention.

FIG. 2 shows an HEW PPDU format according to an embodiment of the present invention.

An L-STF may be used for frame detection, Automatic Gain Control (AGC), diversity detection, and coarse frequency/time synchronization.

An L-LTF may be used for fine frequency/time synchronization and channel estimation.

An L-SIG may include information indicating a total length of a corresponding PPDU (or information indicating a transmission time of a physical layer protocol service unit (PSDU)).

The L-STF, the L-LTF and the L-SIG may be identical to L-STF, L-LTF and L-SIG of the VHT system. The L-STF, the L-LTF and the L-SIG may be referred to as a legacy portion. The L-STF, the L-LTF, and the L-SIG may be transmitted in at least one Orthogonal Frequency Division Multiplexing (OFDM) symbol generated on the basis of 64-points Fast Fourier Transform (FFT) (or 64 subcarriers) in each 20 MHz channel. For 20 MHz transmission, the legacy portion may be generated by performing an inverse Discrete Fourier Transform (IDFT) with 64 FFT points. For 40 MHz transmission, the legacy portion may be generated by performing an IDFT with 128 FFT points. For 80 MHz transmission, the legacy portion may be generated by performing an IDFT with 512 FFT points.

A HEW-SIGA may include common control information commonly received by an STA which receives a PPDU. The HEW-SIGA may be transmitted in 2 OFDM symbols or 3 OFDM symbols.

The following table exemplifies information included in the HEW-SIGA. A field name or the number of bits is for exemplary purposes only.

TABLE 1

| Field | Bits | Description |
| --- | --- | --- |
| Bandwidth | 2 | Set to 0 for 20 MHz, 1 for 40 MHz, 2 for 80 MHz, 3 for 160 MHz and 80 + 80 MHz mode |
| STBC | 1 | Set to 1 if all streams use STBC, otherwise set to 0. When STBC bit is 1, an odd number of space time streams per user is not allowed. |
| Group ID | 6 | Set to the value of the TXVECTOR parameter GROUP_ID. A value of 0 or 63 indicates a HEW SU PPDU; otherwise, indicates a HEW MU PPDU. |
| Nsts/Partial AID | 12 | For MU: 3 bits/user with maximum of 4 users<br>Set to 0 for 0 space time streams<br>Set to 1 for 1 space time stream<br>Set to 2 for 2 space time streams<br>Set to 3 for 3 space time streams<br>Set to 4 for 4 space time streams<br>Otherwise: first 3 bits contain stream allocation for SU, set to 0 for 1 space time stream, set to 1 for 2 space time streams, etcetera up to 8 streams. Remaining 9 bits contain partial association identifier (AID). |
| No TXOP PS | 1 | Set to 1 to indicate that TXOP PS is not allowed. Set to 0 to indicate that TXOP PS is allowed. Set to the same value in all PPDUs in downlink MU TXOP. |
| GI (Guard interval) | 2 | Set B0 to 0 for Long GI, set to 1 for Short GI. Set B1 to 1 when Short GI. |
| Coding | 2 | For SU:<br>    Set B2 to 0 for BCC, set to 1 for LDPC<br>For MU:<br>    Set B2 to 0 for BCC, set to 1 for LDPC for 1st user<br>If user 1 has 0 Nsts value, then B2 is reserved and set to 1 |
| MCS | 4 | For SU/Broadcast/Multicast: Modulation and coding scheme (MCS) index<br>For MU:<br>    B1: Set to 0 for BCC, 1 for LDPC for the 2nd user<br>    B2: Set to 0 for BCC, 1 for LDPC for the 3rd user<br>    B3: Set to 0 for BCC, 1 for LDPC for the 4th user<br>If user 2, 3, or 4 has 0 Nsts value, then corresponding bit is reserved and set to 1 |
| SU-Beamformed | 1 | Set to 1 when packet is a SU-beamformed packet<br>Set to 0 otherwise<br>For MU: Reserved, set to 1 |
| CRC | 8 | |
| Tail | 6 | All zeros |

A HEW-STF may be used to improve an AGC estimation in an MIMO transmission.

A HEW-LTF may be used to estimate a MIMO channel. The HEW-LTF may start at the same point of time and may end at the same point of time across all users.

A HEW-SIGB may include user-specific information required for each STA to receive its PSDU. For example, the HEW-SIGB may include information regarding a length of a corresponding PSDU and/or a bandwidth or channel in which the PSDU for a corresponding receiver is transmitted.

A data portion may include at least one PSDU. The position of the HEW-SIGB is illustration purpose only. The HEW-SIGB may be followed by the data portion. The HEW-SIGB may be followed by the HEW-STF or the HEW-LTF.

In the proposed PPDU format, the number of OFDM subcarriers may be increased per unit frequency. The number of OFDM subcarriers may increase K-times by increasing FFT size. K may be 2, 4, or 8. This increase may be accomplished via downclocking (e.g, using a larger FFT size with a same sampling rate).

For example, K=4 downclocking is assumed. As for the legacy portion, 64 FFT is used in a 20 MHz channel, 128 FFT is used in a 40 MHz channel, and 256 FFT is used in an 80 MHz channel. As for a HEW portion using the larger FFT size, 256 FFT is used in a 20 MHz channel, 512 FFT is used in a 40 MHz channel, and 1024 FFT is used in an 80 MHz channel. The HEW-SIGA may have same FFT size as the legacy portion. The HEW portion may have larger FFT size than the legacy portion.

The PPDU is generated by performing IDFT with two different FFT sizes. The PPDU may include a first part with a first FFT size and a second part with a second FFT size. The first part may include at least one of the L-STF, the L-LTF, the L-SIG and the HEW-SIGA. The second part may include at least one of the HEW-STF, the HEW-LTF and the data portion. The HEW-SIGB may be included in the first part or in the second part.

When an FFT size is increased, an OFDM subcarrier spacing is decreased and thus the number of OFDM subcarriers per unit frequency is increased, but an OFDM symbol duration is increased. A guard interval (GI) (or also referred to as a Cyclic Prefix (CP) length) of the OFDM symbol time can be decreased when the FFT size is increased.

If the number of OFDM subcarriers per unit frequency is increased, a legacy STA supporting the conventional IEEE 80.2.11a/g/n/ac cannot decode a corresponding PPDU. In order for the legacy STA and an HEW STA to co-exist, L-STF, L-LTF, and L-SIG are transmitted through 64 FFT in a 20 MHz channel so that the legacy STA can receive the L-STF, the L-LTF, and the L-SIG. For example, the L-SIG is transmitted in a single OFDM symbol, a symbol time of the single OFDM symbol is 4 micro seconds (us), and the GI is 0.8 us.

Although the HEW-SIGA includes information required to decode an HEW PPDU by the HEW STA, the HEW-SIGA may be transmitted through 64 FFT in an 20 MHz channel so that it can be received by both of the legacy STA and the HEW STA. This is to allow the HEW STA to receive not only the HEW PPDU but also the conventional non-HT/HT/VHT PPDU.

Figure 3:
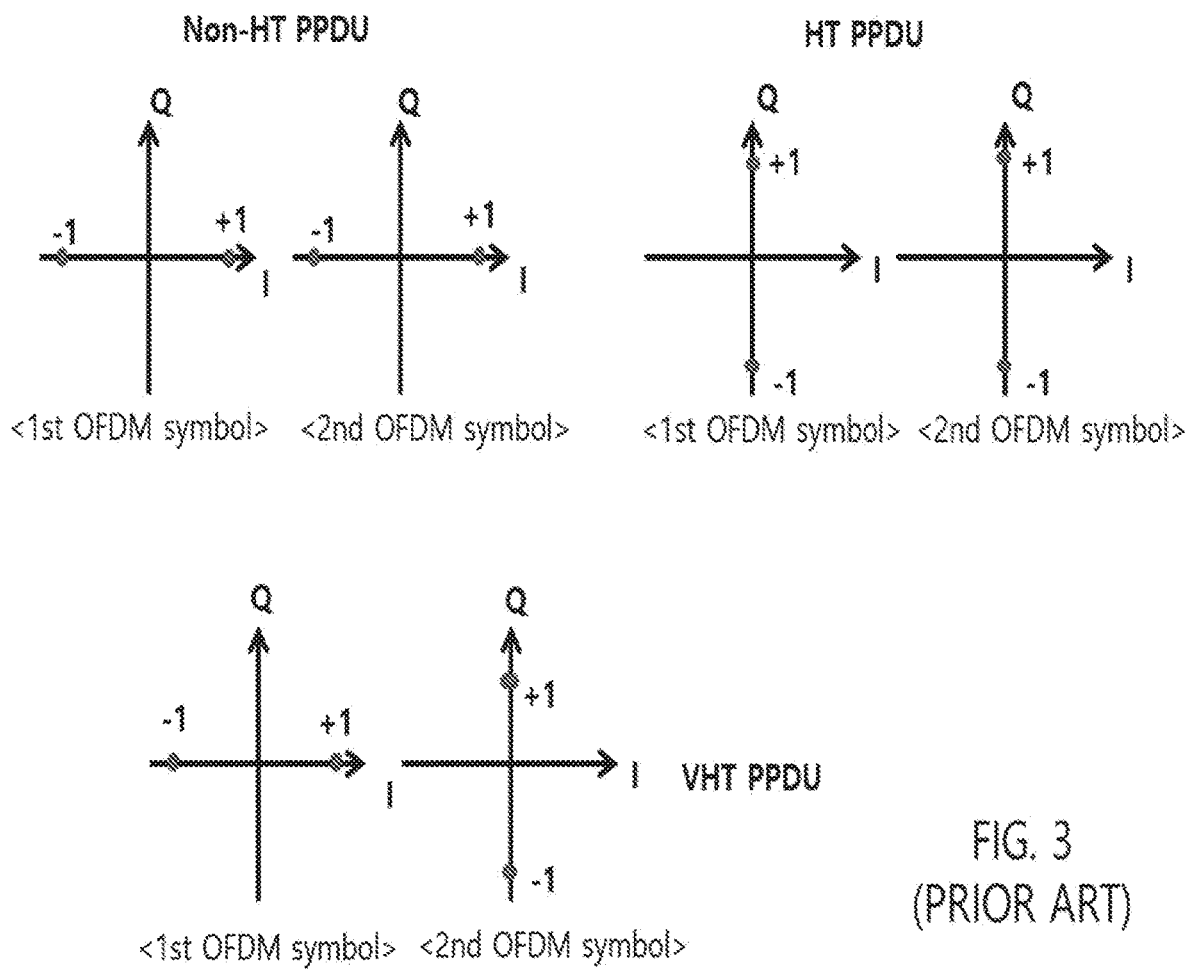
FIG. 3 shows constellation phases for the conventional PPDU.

FIG. 3 shows constellation phases for the conventional PPDU.

To identify a format of a PPDU, a phase of a constellation for two OFDM symbols transmitted after L-STF, L-LTF, and L-SIG is used.

A 'first OFDM symbol' is an OFDM symbol first appeared after the L-SIG. A 'second OFDM symbol' is an OFDM symbol subsequent to the first OFDM symbol.

In a non-HT PPDU, the same phase of the constellation is used in the 1st OFDM symbol and the 2nd OFDM symbol. Binary Phase Shift Keying (BPSK) is used in both of the 1st OFMD symbol and the 2nd OFDM symbol.

In an HT PPDU, although the same phase of the constellation is used in the 1st OFDM symbol and the 2nd OFDM symbol, the constellation rotates by 90 degrees in a counterclockwise direction with respect to the phase used in the non-HT PPDU. A modulation scheme having a constellation which rotates by 90 degrees is called Quadrature Binary Phase Shift Keying (QBPSK).

In a VHT PPDU, a constellation of the first OFDM symbol is identical to that of the non-HT PPDU, whereas a constellation of the second OFDM symbol is identical to that of the HT PPDU. The constellation of second OFDM symbol rotates 90 degrees in a counterclockwise direction with respect to the 1st OFDM symbol. The first OFDM symbol uses BPSK modulation, and the 2nd OFDM symbol uses QBPSK modulation. Since VHT-SIG-A is transmitted after L-SIG and the VHT-SIG-A is transmitted in two OFDM symbols, the first OFDM symbol and the second OFDM symbol are used to transmit the VHT-SIG-A.

Figure 4:
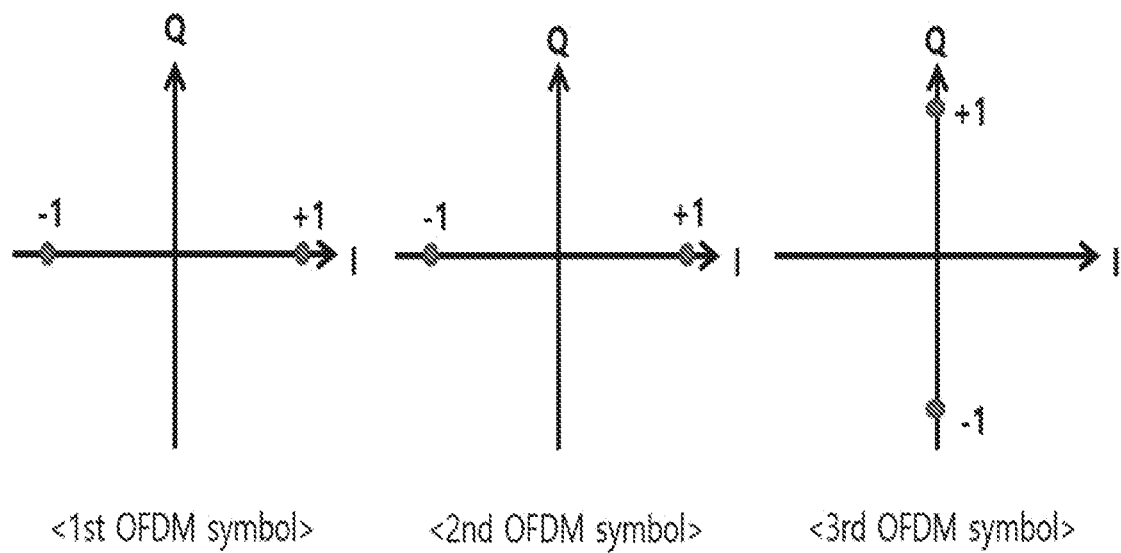
FIG. 4 shows constellation phases for a proposed HEW PPDU.

FIG. 4 shows constellation phases for a proposed HEW PPDU.

To distinguish from a non-HT/HT/VHT PPDU, a constellation of at least one OFDM symbol transmitted after L-SIG can be used.

Just like the non-HT PPDU, a first OFDM symbol and a second OFDM symbol of the HEW PPDU have the same constellation phase. A BPSK modulation may be used for the first OFDM symbol and the second OFDM symbol. The STA can differentiate the HEW PPDU and HT/VHT PPDUs.

In an embodiment, to differentiate the HEW PPDU and the non-HT PPDU, the constellation of a third OFDM symbol can be utilized. The constellation of the third OFDM symbol may rotate by 90 degrees in a counterclockwise direction with respect to the second OFDM symbol. The first and second OFDM symbols may use BPSK modulation, but the third OFDM symbol may use QBPSK modulation.

In another embodiment, the HEW-SIGA may provide an indication about the format of the PPDU. The indication may indicate whether the format of the PPDU is a HEW PPDU. The HEW-SIGA may provide an indication about a use of orthogonal frequency division multiple access (OFDMA).

Hereinafter, a PPDU using a phase rotation in frequency domain is proposed in order to support lower Peak-to-Average Power Ratio (PAPR).

For clarity, it is assumed that the second part (i.e. HEW part) of the PPDU uses 4-times FFT size via downclocking.

Hereinafter, a subchannel refers to a resource allocation unit to be allocated to a STA. Operating bandwidth (i.e. 20 MHz channel, 40 MHz channel, 80 MHz channel or 160 MHz channel) can be divided into a plurality of subchannels. A subchannel may include one or more subcarriers. The plurality of subchannels may have same number of subcarriers or different number of subcarriers. One or more subchannels can be allocated to the STA. The STA can transmit one or more PPDUs through the allocated subchannels. The subchannel may be referred to as 'a subband' or 'a subgroup'.

FIG. 5 shows an HEW PPDU format using 256 FFT in a 20 MHz channel.

The first part (i.e. L-LTF, L-LTF, L-SIG and HEW-SIGA) uses 64 FFT in the 20 MHz channel. In order to implement the 256 FFT in the second part, it is proposed to decrease an overhead by performing ¼ down-clocking on a VHT 80 MHz PPDU format and by decreasing GI to 0.8 us and 0.4 us.

If the VHT 80 MHz PPDU format is subjected to ¼ down-clocking, an OFDM symbol time is increased by four times, and thus is 16 us when using Long GI, and is 14.4 us when using Short GI. That is, the GI is also increased to 3.2 us in case of Long GI and to 1.6 us in case of Short GI. However, the GI may keep to 0.8 us in case of Long GI and to 0.4 us in case of Short GI. In doing so, after performing the ¼ downclocking, the OFDM symbol time is 13.6 us when using Long GI and is 13.2 us when using Short GI.

If the VHT 80 MHz PPDU format is subjected to ¼ down-clocking in the 20 MHz channel, each of 64 FFT-based VHT-STF, VHT-LTF, and VHT-SIG-B may constitute one subchannel, and as a result, 4 subchannels are combined and transmitted through the 20 MHz channel in unit of 256 FFT.

In FIG. 5, in order to decrease a Peak-to-Average Power Ratio (PAPR) of a transmitter STA, the second part may be subjected to multiplication for a phase waveform in unit of subchannel as follows.

$$R(k) = \begin{cases} -1, k \geq -64 \\ +1, k < -64 \end{cases}$$ [Equation 1]

Herein, R(k) denotes a multiplication value for a phase waveform at a subcarrier index k. 256 subcarrier are divided into 4 subchannels. Respective subchannel is composed of 64 subcarriers. A sequence $\{+1, -1, -1, -1\}$ may be multiplied for the 4 subchannels, starting from a subchannel having a smallest subcarrier index, that is, a lowermost subchannel. The number of subchannels and the sequence $\{+1, -1, -1, -1\}$ are exemplary purpose only. 256 subcarriers may be divided into a plurality of subchannels and respective subchannel may be phase-rotated by multiplying +1 or −1.

The equation 1 can be expressed as follows. The 256 subcarriers are divided into first and second subgroups that have different number of subcarriers. The first subgroup is phase-rotated by multiplying +1 and the second subgroup is phase-rotated by multiplying −1.

A sequence constituting the HEW-STF and the HEW-LTF may be as follows.
HEW-STF={HTS$_{-58,58}$, 0, 0, 0, 0, 0, 0, 0, 0, 0, 0, 0, HTS$_{-58,58}$},
HEW-LTF={LTFleft, 1, LTFright, −1, −1, −1, 1, 1, −1, 1, −1, 1, 1, −1, LTFleft, 1, LTFright, 1, −1, 1, −1, 0, 0, 0, 1, −1, −1, 1, LTFleft, 1, LTFright, −1, −1, −1, 1, 1, −1, 1, −1, 1, 1, −1, LTFleft, 1, LTFright}
where:
HTS$_{-58,58}$=√1/2 {0, 1, 1+j, 0, 0, 0, −1−j, 0, 0, 0, 1+j, 0, 0, 0, −1−j, 0, 0, 0, −1−j, 0, 0, 0, 1+j, 0, 0, 0, 0, 0, 0, −1−j, 0, 0, 0, −1−j, 0, 0, 0, 1+j, 0, 0, 0, 1+j, 0, 0, 0, 1+j, 0, 0, 0, 1+j, 0, 0, 0, 0, 0, 0, 0, 0, 0, 0, 0, 0, 0, 0, 1+j, 0, 0, 0, −1−j, 0, 0, 0, 1+j, 0, 0, 0, −1−j, 0, 0, 0, −1−j, 0, 0, 0, 1+j, 0, 0, 0, 0, 0, 0, 0, −1−j, 0, 0, 0, −1−j, 0, 0, 0, 1+j, 0, 0, 0, 1+j, 0, 0, 0, 1+j, 0, 0, 0, 1+j, 0, 0},
LTFleft={1, 1, −1, −1, 1, 1, −1, 1, −1, 1, 1, 1, 1, 1, −1, −1, 1, 1, −1, 1, −1, 1, 1, 1, 1},
LTFright={1, −1, −1, 1, 1, −1, 1, −1, 1, −1, −1, −1, −1, −1, 1, 1, −1, −1, 1, −1, 1, −1, 1, 1, 1, 1}.

FIG. 6 shows an HEW PPDU format in a 40 MHz channel.

In order to implement the 512 FFT in the 40 MHz channel, it is proposed to use two blocks for the aforementioned 256 FFT transmission of the 20 MHz channel. Like in the 256 FFT transmission in the 20 MHz channel, an OFDM symbol time is 13.6 us when using Long GI, and is 13.2 us when using Short GI.

L-STF, L-LTF, L-SIG, and HEW-SIGA are generated using 64 FFT and are transmitted in a duplicated manner two times in the 40 MHz channel. That is, the first part is transmitted in a first 20 MHz subchannel and its duplication is transmitted in a second 20 MHz subchannel.

In order to decrease a PAPR of a transmitter STA for transmitting the L-STF, the L-LTF, the L-SIG, and the HEW-SIGA, multiplication may be performed on a phase waveform in unit of 20 MHz channel as follows.

$$R(k) = \begin{cases} +j, k \geq 0 \\ +1, k < 0 \end{cases}$$ [Equation 2]

This means that the first part is phase-rotated by multiplying +1 for the first 20 MHz subchannel and is phase-rotated by multiplying +j for the second 20 MHz subchannel.

The equation 2 can be expressed as follows. The 128 subcarriers are divided into first and second subgroups. The first subgroup is phase-rotated by multiplying +1 and the second subgroup is phase-rotated by multiplying +j.

For each 64 FFT-based subchannel constituting 512 FFT, in order to decrease a PAPR of a transmitter STA for transmitting HEW-STF, HEW-LTF, and HEW-SIGB, multiplication may be performed on a phase waveform in unit of subchannel as follows.

$$R(k) = \begin{cases} -1, 64 \leq k \\ +1, 0 \leq k < 64 \\ -1, -192 \leq k < 0 \\ +1, k <= 192 \end{cases}$$ [Equation 3]

More specifically, according to Equation 3, 512 subcarriers are divided into 8 subchannels. Respective subchannel is composed of 64 subcarriers. A sequence $\{+1, -1, -1, -1, +1, -1, -1, -1\}$ may be multiplied for the 8 subchannels, starting from a subchannel having a smallest subcarrier index, that is, a lowermost subchannel.

The equation 3 can be expressed as follows. The 512 subcarriers are divided into four subgroups. The first subgroup is phase-rotated by multiplying +1, the second subgroup is phase-rotated by multiplying −1, the third subgroup is phase-rotated by multiplying +1, and the fourth subgroup is phase-rotated by multiplying −1.

A sequence constituting the HEW-STF and the HEW-LTF may be as follows.
HEW-STF={HTS$_{-58,58}$, 0, 0, 0, 0, 0, 0, 0, 0, 0, 0, 0, HTS$_{-58,58}$, 0, 0, 0, 0, 0, 0, 0, 0, 0, 0, 0, HTS$_{-58,58}$, 0, 0, 0, 0, 0, 0, 0, 0, 0, 0, 0, HTS$_{-58,58}$},
HEW-LTF={LTFleft, 1, LTFright, −1, −1, −1, 1, 1, −1, 1, −1, 1, 1, −1, LTFleft, 1, LTFright, 1, −1, 1, −1, 0, 0, 0, 1, −1, −1, 1, LTFleft, 1, LTFright, −1, −1, −1, 1, 1, −1, 1, −1, 1, 1, −1, LTFleft, 1, LTFright, 0, 0, 0, 0, 0, 0, 0, 0, 0, 0, 0, LTFleft, 1, LTFright, −1, −1, −1, 1, 1, −1, 1, −1, 1, 1, −1, LTFleft, 1, LTFright, 1, −1, 1, −1, 0, 0, 0, 1, −1, −1, 1,
LTFleft, 1, LTFright, −1, −1, −1, 1, 1, −1, 1, −1, 1, 1, −1,
LTFleft, 1, LTFright}

Herein, $HTS_{-58,58}=\sqrt{1/2}$ {0, 1, 1+j, 0, 0, 0, −1−j, 0, 0, 0, 1+j, 0, 0,
0, −1−j, 0, 0, 0, −1−j, 0, 0, 0, 1+j, 0, 0, 0, 0, 0, 0, 0, −1−j,
0, 0, 0, −1−j, 0, 0, 0, 1+j, 0, 0, 0, 1+j, 0, 0, 0, 1+j, 0, 0,
0, 1+j, 0, 0, 0, 0, 0, 0, 0, 0, 0, 0, 0, 0, 0, 0, 1+j, 0, 0, 0,
−1−j, 0, 0, 0, 1+j, 0, 0, 0, −1−j, 0, 0, 0, −1−j, 0, 0, 0, 1+j,
0, 0, 0, 0, 0, 0, 0, −1−j, 0, 0, 0, −1−j, 0, 0, 0, 1+j, 0, 0, 0,
1+j, 0, 0, 0, 1+j, 0, 0, 0, 1+j, 0, 0}, LTFleft={1, 1, −1, −1, 1, 1, −1, 1, −1, 1, 1, 1, 1, 1, 1, −1, −1,
1, 1, −1, 1, −1, 1, 1, 1, 1}, LTFright={1, −1, −1, 1, 1, −1, 1, −1, 1, −1, −1, −1, −1, −1,
1, 1, −1, −1, 1, −1, 1, −1, 1, 1, 1, 1}.

FIG. 7 shows an HEW PPDU format in an 80 MHz channel.

In order to implement the 1024 FFT in the 80 MHz channel, it is proposed to use four blocks for the aforementioned 256 FFT transmission of the 20 MHz channel. Like in the 256 FFT transmission in the 20 MHz channel, an OFDM symbol time is 13.6 us when using Long GI, and is 13.2 us when using Short GI.

L-STF, L-LTF, L-SIG, and HEW-SIGA which are transmitted using 64 FFT are also transmitted in a duplicated manner four times in the 80 MHz channel. That is, the first part is transmitted in a first 20 MHz subchannel and its duplications are transmitted in second, third and fourth 20 MHz subchannels respectively.

In order to decrease a PAPR of a transmitter STA for transmitting the L-STF, the L-LTF, the L-SIG, and the HEW-SIGA, multiplication may be performed on a phase waveform in unit of 20 MHz channel as follows.

$$R(k) = \begin{cases} -1, k \geq -64 \\ +1, k < -64 \end{cases}$$ [Equation 4]

This means that the first part is phase-rotated by multiplying +1 for the first 20 MHz subchannel and is phase-rotated by multiplying −1 for the second, third and fourth 20 MHz subchannels.

The equation 4 can be expressed as follows. The 256 subcarriers are divided into first and second subgroups that have different number of subcarriers. The first subgroup is phase-rotated by multiplying +1 and the second subgroup is phase-rotated by multiplying −1.

For each 64 FFT-based subchannel constituting 1024 FFT, in order to decrease a PAPR of a transmitter STA for transmitting HEW-STF, HEW-LTF, and HEW-SIGB, multiplication may be performed on a phase waveform in unit of subchannel as follows.

$$R(k) = \begin{cases} -1, 256 \leq k \\ +1, 192 \leq k < 256 \\ -1, 64 \leq k < 192 \\ +1, 0 \leq k 64 \\ -1, -192 \leq k < 0 \\ +1, 256 \leq k \leq -192 \\ -1, -448 \leq k < -256 \\ +1, k < -448 \end{cases}$$ [Equation 5]

More specifically, according to Equation 5, 1024 subcarriers are divided into 16 subchannels. Respective subchannel is composed of 64 subcarriers. A sequence {+1, −1, −1, −1, +1, −1, −1, −1, +1, −1, −1, −1, +1, −1, −1, −1} may be multiplied for the 16 subchannels, starting from a subchannel having a smallest subcarrier index, that is, a lowermost subchannel.

The equation 5 can be expressed as follows. The 1024 subcarriers are divided into 8 subgroups. The first subgroup is phase-rotated by multiplying +1, the second subgroup is phase-rotated by multiplying −1, the third subgroup is phase-rotated by multiplying +1, the fourth subgroup is phase-rotated by multiplying −1, the fifth subgroup is phase-rotated by multiplying +1, the sixth subgroup is phase-rotated by multiplying −1, the seventh subgroup is phase-rotated by multiplying +1 and the eighth subgroup is phase-rotated by multiplying −1.

A sequence constituting the HEW-STF and the HEW-LTF is as follows.

HEW-STF={$HTS_{-58,58}$, 0, 0, 0, 0, 0, 0, 0, 0, 0, 0, 0,
$HTS_{-58,58}$, 0, 0, 0, 0, 0, 0, 0, 0, 0, 0, 0, $HTS_{-58,58}$, 0, 0,
0, 0, 0, 0, 0, 0, 0, 0, 0, $HTS_{-58,58}$, 0, 0, 0, 0, 0, 0, 0, 0, 0, 0,
0, 0, $HTS_{-58,58}$, 0, 0, 0, 0, 0, 0, 0, 0, 0, 0, 0, $HTS_{-58,58}$,
0, 0, 0, 0, 0, 0, 0, 0, 0, 0, 0, $HTS_{-58,58}$, 0, 0, 0, 0, 0, 0, 0,
0, 0, 0, 0, $HTS_{-58,58}$},

HEW-LTF={LTFleft, 1, LTFright, −1, −1, −1, 1, 1, −1, 1, −1,
1, 1, −1, LTFleft, 1, LTFright, 1, −1, 1, −1, 0, 0, 0, 1, −1,
−1, 1, LTFleft, 1, LTFright, −1, −1, −1, 1, 1, −1, 1, −1, 1,
1, −1, LTFleft, 1, LTFright, 0, 0, 0, 0, 0, 0, 0, 0, 0, 0, 0,
LTFleft, 1, LTFright, −1, −1, −1, 1, 1, −1, 1, −1, 1, 1, −1,
LTFleft, 1, LTFright, 1, −1, 1, −1, 0, 0, 0, 1, −1, −1, 1,
LTFleft, 1, LTFright, −1, −1, −1, 1, 1, −1, 1, −1, 1, 1, −1,
LTFleft, 1, LTFright, 0, 0, 0, 0, 0, 0, 0, 0, 0, 0, 0, LTFleft,
1, LTFright, −1, −1, −1, 1, 1, −1, 1, −1, 1, 1, −1, LTFleft,
1, LTFright, 1, −1, 1, −1, 0, 0, 0, 1, −1, −1, 1, LTFleft, 1,
LTFright, −1, −1, −1, 1, 1, −1, 1, −1, 1, 1, −1, LTFleft, 1,
LTFright, 0, 0, 0, 0, 0, 0, 0, 0, 0, 0, 0, LTFleft, 1, LTFright,
−1, −1, −1, 1, 1, −1, 1, −1, 1, 1, −1, LTFleft, 1, LTFright,
1, −1, 1, −1, 0, 0, 0, 1, −1, −1, 1, LTFleft, 1, LTFright, −1,
−1, −1, 1, 1, −1, 1, −1, 1, 1, −1, LTFleft, 1, LTFright}, Herein, $HTS_{-58,58}=\sqrt{1/2}$ {0, 1, 1+j, 0, 0, 0, −1−j, 0, 0, 0, 1+j, 0, 0,
0, −1−j, 0, 0, 0, −1−j, 0, 0, 0, 1+j, 0, 0, 0, 0, 0, 0, 0, −1−j,
0, 0, 0, −1−j, 0, 0, 0, 1+j, 0, 0, 0, 1+j, 0, 0, 0, 1+j, 0, 0,
0, 1+j, 0, 0, 0, 0, 0, 0, 0, 0, 0, 0, 0, 0, 0, 0, 1+j, 0, 0, 0,
−1−j, 0, 0, 0, 1+j, 0, 0, 0, −1−j, 0, 0, 0, −1−j, 0, 0, 0, 1+j,
0, 0, 0, 0, 0, 0, 0, −1−j, 0, 0, 0, −1−j, 0, 0, 0, 1+j, 0, 0, 0,
1+j, 0, 0, 0, 1+j, 0, 0, 0, 1+j, 0, 0}, LTFleft={1, 1, −1, −1, 1, 1, −1, 1, −1, 1, 1, 1, 1, 1, 1, −1, −1,
1, 1, −1, 1, −1, 1, 1, 1, 1}, LTFright={1, −1, −1, 1, 1, −1, 1, −1, 1, −1, −1, −1, −1, −1,
1, 1, −1, −1, 1, −1, 1, −1, 1, 1, 1, 1}

An FFT size can be increased to improve PPDU transmission efficiency. In order to provide compatibility with the legacy STA, the first part (STF, LTF, L-SIG and HEW-SIGA) using the same FFT size as the legacy PPDU is first transmitted, and subsequently the second part (HEW-STF, HEW-LTF, HEW-SIGB and a PSDU) using a larger FFT size are transmitted.

In order to decrease a PAPR of a transmitter STA, the first part and the second part uses different phase rotation in frequency domain. It means that a phase rotation for subcarriers in the first part is different from a phase rotation for subcarriers in the second part.

Figure 8:
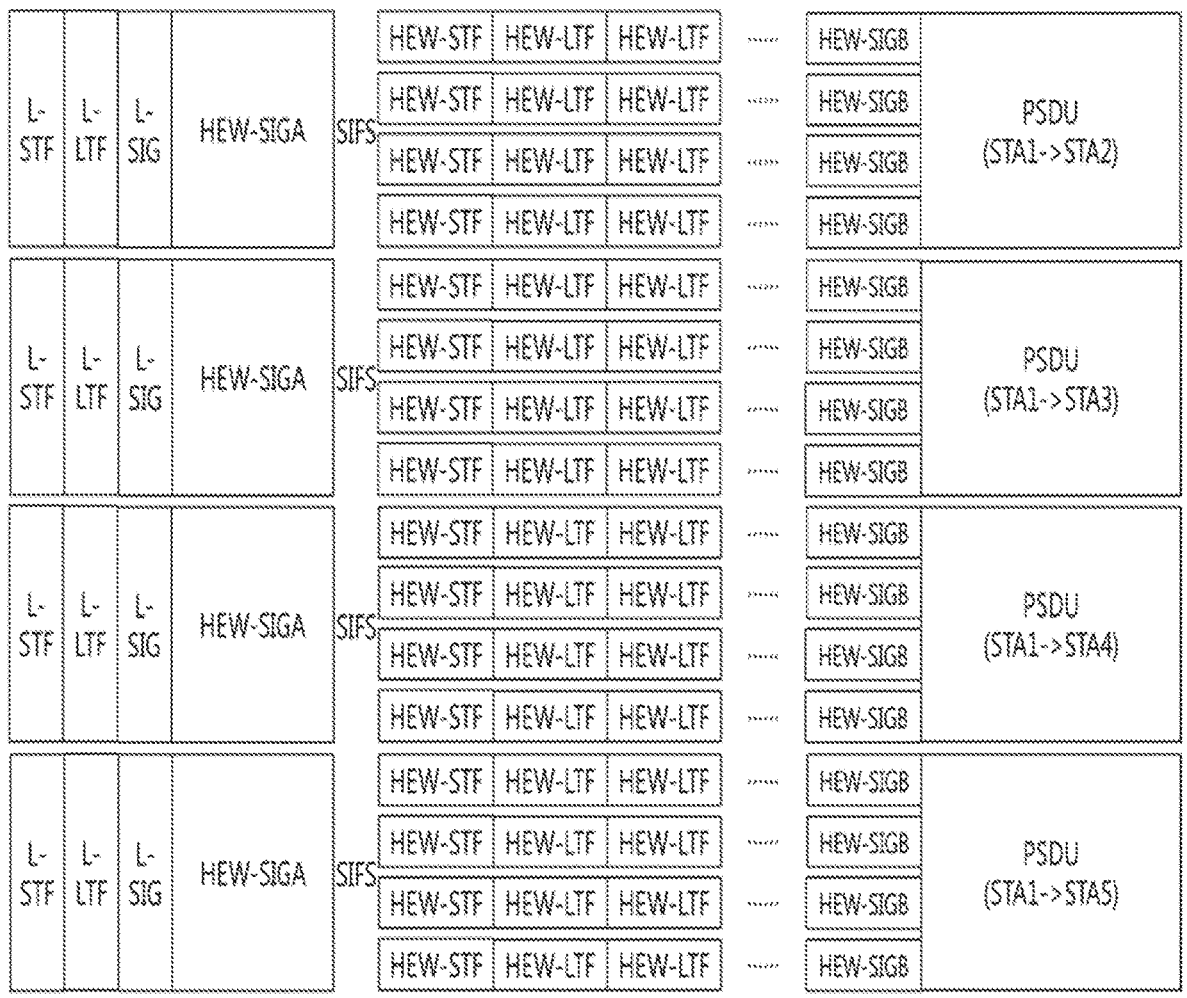
FIG. 8 shows a PPDU format according to another embodiment of the present invention.

FIG. 8 shows a PPDU format according to another embodiment of the present invention.

Since the number of OFDM subcarriers per unit frequency increases after transmitting L-STF, L-LTF, L-SIG, and HEW-SIGA, a processing time may be required to process data with larger FFT size. The processing time may be called an HEW transition gap.

In an embodiment, the HEW transition gap may be implemented by defining a Short Inter-Frame Space (SIFS)

followed by the HEW-STF. The SIFS may be positioned between the HEW-SIGA and the HEW-STF. The SIFS may be positioned between the HEW-SIGB and the HEW-STF.

In another embodiment, the HEW transition gap may be implemented in such a manner that the HEW-STF is transmitted one more time. The duration of the HEW-STF may vary depending on the processing time or STA's capability. If the processing time is required, the duration of the HEW-STF may become double.

Now, a channel access mechanism is described according to an embodiment of the present invention. It is proposed to adjust a Clear Channel Assessment (CCA) sensitivity level.

A basic service set (BSS) may include a set of STAs that have successfully synchronized with an AP. A basic service set identifier (BSSID) is a 48 bits identifier of a corresponding BSS. An overlapping basic service set (OBSS) may be a BSS operating on the same channel as the STA's BSS. The OBSS is one example of different BSS with the STA's BSS.

When an STA performs the channel access mechanism, it is first determined whether a channel state of a 20 MHz primary channel is idle/busy. If the channel state is idle, a frame is directly transmitted after a Distributed Inter-Frame Space (DIFS) elapses. Otherwise, if the channel state is busy, the frame is transmitted after performing a back-off procedure.

In the back-off procedure, a STA selects any random number in the range between 0 to Contention Window (CW) and sets the number as a back-off timer. If a channel is idle during a back-off slot time, the back-off timer is decremented by 1. When the back-off timer reaches 0, the STA transmits the frame.

7.3.5.12.2 Semantics of the service primitive
The primitive provides the following parameters:

PHY-CCA.indication(
STATE,
IPI-REPORT,
channel-list
)

The STATE parameter can be one of two values: BUSY or IDLE. The parameter value is BUSY if the assessment of the channel(s) by the PHY determines that the channel(s) are not available. Otherwise, the value of the parameter is IDLE.

The IPI-REPORT parameter is present if dot11RadioMeasurementActivated is true and if IPI reporting has been turned on by the IPI-STATE parameter. The IPI-REPORT parameter provides a set of IPI values for a time interval. The set of IPI values may be used by the MAC sublayer for Radio Measurement purposes. The set of IPI values are recent values observed by the PHY entity since the generation of the most recent PHYTXEND.confirm, PHY-RXEND.indication, PHY-CCARESET.confirm, or PHY-CCA.indication primitive, whichever occurred latest.

When STATE is IDLE or when, for the type of PHY in operation, CCA is determined by a single channel, the channel-list parameter is absent. Otherwise, it carries a set indicating which channels are busy. The channel-list parameter in a PHY-CCA.indication primitive generated by a HEW STA contains at most a single element. The channel-list parameter element defines the members of this set.

In the PHY-CCA.indication primitive, the channel state is determined to be busy in the following conditions.

TABLE 2

| Operating Channel Width | Channel Busy Conditions |
| --- | --- |
| 20 MHz, 40 MHz, 80 MHz, 160 MHz, or 80 + 80 MHz | The start of a 20 MHz non-HT or HT or VHT PPDU in the primary 20 MHz channel at or above −82 dBm. The start of a 20 MHz HEW PPDU in the primary 20 MHz channel at or above −82 + Δ dBm. |
| 40 MHz, 80 MHz, 160 MHz, or 80 + 80 MHz | The start of a 40 MHz non-HT duplicate or HT or VHT PPDU in the primary 40 MHz channel at or above −79 dBm. The start of a 40 MHz HEW PPDU in the primary 20 MHz channel at or above −79 + Δ dBm. |
| 80 MHz, 160 MHz, or 80 + 80 MHz | The start of an 80 MHz non-HT duplicate or VHT PPDU in the primary 80 MHz channel at or above −76 dBm. The start of an 80 MHz HEW PPDU in the primary 20 MHz channel at or above −76 + Δ dBm. |
| 160 MHz or 80 + 80 MHz | The start of a 160 MHz or 80 + 80 MHz non-HT duplicate or VHT PPDU at or above −73 dBm. The start of a 160 MHz HEW PPDU in the primary 20 MHz channel at or above −73 + Δ dBm. |

In the channel access mechanism, a PHY-CCA.indication primitive is utilized as a means for determining whether the channel state is idle or busy. When the channel state is idle or busy in a Physical layer (PHY) entity, the PHY-CCA.indication primitive is called out and state information is delivered from the PHY entity to a MAC entity.

According to the section 7.3.5.12 of IEEE P802.11-REVmc/D2.0, PHY-CCA.indication is described as follows.
7.3.5.12 PHY-CCA.indication
7.3.5.12.1 Function
This primitive is an indication by the PHY to the local MAC entity of the current state of the medium and to provide observed IPI values when IPI reporting is turned on.

In the Table above, when an adjusting parameter Δ is a positive number, this means that a threshold value for determining whether a channel state of an HEW STA which receives an HEW PPDU is idle/busy is greater than a threshold value for determining this when the conventional legacy PPDU (e.g., a non-HT/HT/VHT PPDU) is received. That is, a threshold value for determining that a channel state is busy as to a frame received from other BSS (i.e. an OBSS AP/STA) may be set to greater than a threshold value for same BSS. The greater threshold value may result in a decrease in a service coverage of corresponding OBSS transmission.

In order to configure a small BSS in which a service coverage of the BSS is decreased, the adjusting parameter Δ may be set to a value greater than or equal to 3.

In order to adjust a CCA sensitivity level as such, there is a need for a method capable of identifying a BSS of received frames since frames can be received from various kinds of BSSs. That is, there is a need to identify whether a currently received frame is transmitted by a STA belonging to the different BSS (i.e. the OBSS AP/STA) or a STA belonging to the same BSS. For example, this is because the determining of the channel state to be idle by increasing the CCA sensitivity level may eventually result in a collision and thus may cause deterioration in throughput performance, if the currently received frame is transmitted by a different STA belonging to the same BSS to an AP or is transmitted by the AP to the different STA belonging to the same BSS.

Increasing the CCA sensitivity has a purpose of improving throughput performance by making frequent simultaneous transmissions and using a Modulation Coding Scheme (MCS) with a high tolerant to an interference caused from the OBSS AP/STA.

A STA becomes a member of a BSS for an AP by establishing a connection with the AP. The STA can receive information about a BSSID from the AP. To perform the CCA, the STA can adjust its CCA sensitivity level. If a received PPDU is transmitted from a STA of same BSS, the CCA sensitivity level may be set to a first threshold for determining whether a channel state of a received PPDU is idle/busy. If a received PPDU is transmitted from a STA of different BSS, the CCA sensitivity level may be set to a second threshold for determining whether a channel state of a received PPDU is idle/busy. The second threshold is different from the first threshold. The second threshold may be greater than the first threshold. The second threshold may be 3 dBm or greater than the first threshold. Any station performing this function can be referred to as an access station.

When a STA is failed to identify whether a currently received frame is transmitted by a STA belonging to the different BSS or a STA belonging to the same BSS (e.g., PHY header error and non-HT or HT PPDU reception), the CCA sensitivity level may be set to a first threshold for determining whether a channel state of a received PPDU is idle/busy.

An embodiment of the present invention proposes to define a COLOR field to identify a BSS. The COLOR field is used for identifying the BSS, and the number of bits thereof is less than that of a BSSID. For example, the BSSID may be 48 bits, whereas the COLOR bit may be 3 bits. The BSSID has the same format as a MAC address, whereas the COLOR field is any value reported in advance by the AP to the STA.

Figure 9:
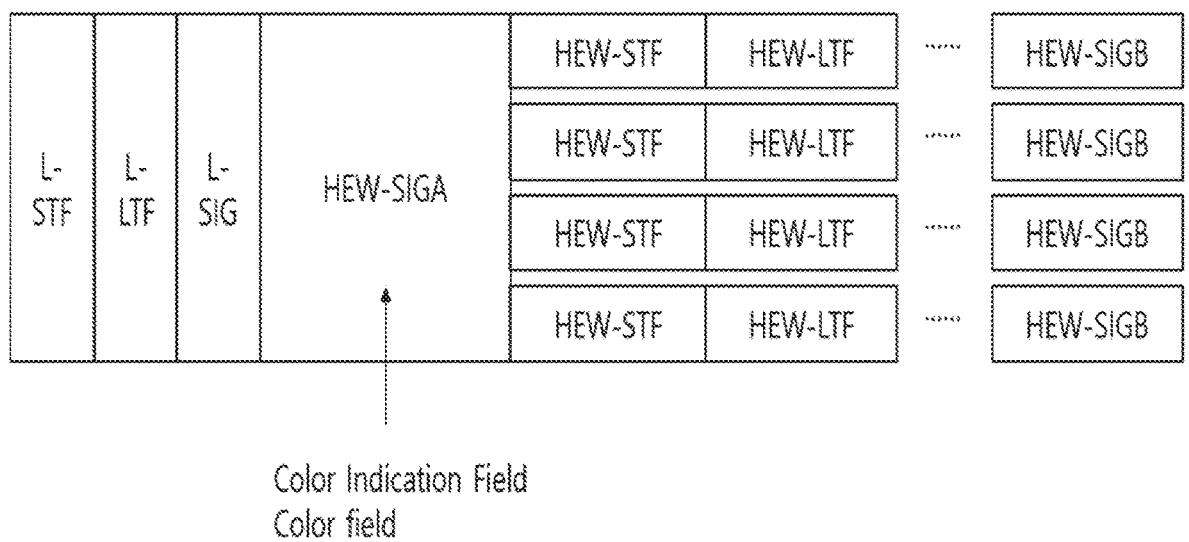
FIG. 9 shows an HEW PPDU format according to an embodiment of the present invention.

FIG. 9 shows an HEW PPDU format according to an embodiment of the present invention.

A COLOR field indicating a COLOR value may be included in an HEW-SIGA. In order to report whether the COLOR field is present, the HEW-SIGA may further include a COLOR indication field. For example, if the COLOR indication field is set to 0, it indicates that the COLOR field is present in the HEW-SIGA. If the COLOR indication field is set to 1, it indicates that the COLOR field is not present in the HEW-SIGA.

The COLOR value may be allocated by an AP to each STA. Information regarding the allocated COLOR value may be included in a beacon frame, a probe response frame, and an association response frame.

A group ID and a partial AID may be utilized as a method of indicating COLOR bits:

TABLE 3

| Condition | Group ID | Partial AID |
|---|---|---|
| Addressed to AP | 0 | BSSID[39:47] |
| Sent by an AP and addressed to a STA associated with that AP | 63 | $(dec(AID[0:8]) + dec(BSSID[44:47]$ XOR $BSSID[40:43]) \times 2^5) \bmod 2^9$ | where XOR is a bitwise exclusive OR operation, mod X indicates the X-modulo operation, dec(A[b:c]) is the cast to decimal operator where b is scaled by $2^0$ and c by $2^{c-b}$.

An association identifier (AID) represents the 16-bit identifier assigned by an AP during association. A partial AID is a non-unique 9-bit STA identifier and is obtained from the AID.

When the STA transmits a frame to the AP, the group ID has a value of 0 and the partial AID has a value of BSSID[39:47]. In doing so, as to the frame addressed to the AP, it is possible to identify whether the frame is transmitted from an STA belonging to the same BSS or an STA belonging to the different BSS. Therefore, in case of an uplink frame, it is possible to reuse the partial AID on the behalf of the COLOR bits.

In case of a frame transmitted by the AP to the STA, the group ID is 63, and the partial AID may be determined as follows.

$$(dec(AID[0:8])+dec(BSSID[44:47] \text{ XOR } BSSID[40:43]) \times 2^5) \bmod 2^9. \quad \text{[Equation 6]}$$

The partial AID has a value between 1 to 511. In this case, it is not possible to identify whether a corresponding frame is transmitted by an AP belonging to the same BSS or an AP belonging to the different BSS.

Therefore, in case of a downlink unicast frame, the partial AID cannot be reused with the COLOR bits, and thus the HEW-SIGA needs to have the COLOR field.

If an HEW AP overhears a frame having a value of a group ID 63 and a partial AID in the range of 1 to 511, the HEW AP can acknowledge whether the frame is transmitted by an OBSS AP to a different OBSS STA or the frame is transmitted directly between STAs belonging to the same BSS. In other words, if an HEW STA overhears a frame having the group ID 63 and the partial AID in the range of 1 to 511, the HEW STA cannot know whether the frame is transmitted by the AP belonging to the same BSS or by the OBSS AP. However, the HEW AP can confirm that the frame is transmitted from the OBSS STA if it is known that STAs to which direction communication (e.g., a Direct Link Setup (DLS) or a Tunneled Direct Link Setup (TDLS)) was established in a BSS and if a partial AID of the received frame is not identical to a partial AID of a peer STA to which direct communication was established. In addition, in this case, a channel access mechanism may be continued by increasing a CCA sensitivity level.

However, if the partial AID of the received frame is identical to the partial AID of the peer STA, the HEW AP may follow one of two procedures as follows.

First, if the channel access mechanism is continued by increasing the CCA sensitivity level but a back-off timer expires, the HEW AP may transmit a frame to another STA other than STAs which have the partial AID of the received frame.

Second, the channel access mechanism may be deferred until expected direct communication is completed.

A COLOR value of a BSS may be delivered to the HEW STA through a beacon frame, a probe response frame, and a (re)-association response frame. Alternatively, the HEW STA may overhear any frame belonging to the BSS and may extract the COLOR value from the overheard frame. If a STA knows the COLOR value of the BSS, the STA may set the COLOR value in the HEW-SIGA for a frame to be transmitted to another STA belonging to the BSS.

Least Significant Bit (LSB) 3 bits of the partial AID or Most Significant Bit (MSB) 3 bits thereof may be utilized as the COLOR value. In this case, as one embodiment for a legacy STA, for example, a HEW AP can calculate a partial AID in the same manner as shown in Equation 6 when the HEW AP sends a frame to a VHT STA.

The HEW AP may allocate an AID of the STA such that LSB 3 bits or MSB 3 bits have the same COLOR value. The AP may send a PPDU1 with the COLOR field and a COLOR indication field that is set to 0. The AP may send to a VHT STA a PPDU2 with a COLOR indication field that is set to 1. A HEW STA which overhears the PPDU2 does not acquire any COLOR information from the PPDU2. This is because the AP may allocate an AID of a legacy STA in a conventional manner without considering the COLOR value.

In case of a broadcast/multicast frame transmitted by the AP to all STAs, a group ID is set to 63 and a partial AID is set to 0. Since the group ID and the partial AID have the same value irrespective of a BSS, it is not possible to identify whether the frame is transmitted from an AP belonging to the same BSS or an OBSS AP. Accordingly, in case of a downlink broadcast/multicast frame, a partial AID cannot be reused with COLOR bits, and thus the HEW-SIGA needs to have COLOR 3 bits.

However, this may be limited to the HEW STA. If the HEW AP overhears a frame having a group ID 63 and a partial AID 0, it can be confirmed that the frame is transmitted from the OBSS AP. In other words, if the HEW STA overhears the frame having the group ID 63 and the partial AID 0, the HEW STA cannot know whether the frame is transmitted from the AP belonging to the same BSS or the OBSS AP. However, the HEW AP can determine this, and thus a channel access mechanism can be continued by increasing a CCA sensitivity level.

When it is known that the currently received frame is transmitted from different BSS (i.e. the OBSS AP/STA), the HEW AP may report such a fact to its HEW STA. For this, the HEW AP may transmit an OBSS announcement control frame to HEW STAs belonging to the BSS of the HEW AP.

The following table shows a format of the OBSS announcement control frame. Field names and bit numbers are exemplary purpose only.

TABLE 4

| Frame Control | Duration | RA | TA (BSSID) | FCS |
|---|---|---|---|---|
| 2 octets | 2 octets | 2 octets | 2 octets | 2 octets |

The duration field may be set to a value obtained by subtracting a delay time consumed in a channel access process after the HEW AP recognizes OBSS transmission from a transmission time of corresponding OBSS transmission.

The RA field may be set to a broadcast MAC address or individual STA MAC address. If corresponding OBSS transmission is reported to a specific STA in order to continue a channel access mechanism by increasing a CCA sensitivity level, the MAC address of the specific STA may be included in the RA field. Otherwise, if the corresponding OBSS transmission is reported to all STAs belonging to the BSS in order to continue the channel access mechanism by increasing the CCA sensitivity level, the broadcast MAC address may be included in the RA field.

The TA field may set to a BSSID of an HEW AP for transmitting the OBSS announcement control frame.

When the HEW STA receives the OBSS announcement control frame, the HEW STA may determines whether the OBSS announcement control frame is transmitted by an HEW AP associated with the HEW STA by using the TA field. If the BSSID in the TA field is same as a BSSID of the HEW STA, the HEW STA may continue to perform the channel access mechanism by increasing the CCA sensitivity level during an interval indicated by the duration field if the RA field is matched to a MAC address of the HEW STA or broadcast MAC address.

If the AP transmits a MU-MIMO frame, a group ID has a value in the range of 1 to 62. This implies that the MU-MIMO frame does not include the partial AID field. Since the group ID may be set to any value irrespective of a BSS, the group ID cannot be used to identify whether a corresponding frame is transmitted by an AP belonging to the same BSS or an OBSS AP. Accordingly, in case of a MU-MIMO frame, HEW-SIG-A needs to have COLOR 3 bits.

If the HEW AP overhears a frame having a group ID value in the range of 1 to 62, the HEW AP can confirm that the MU-MIMO frame is transmitted from the OBSS AP. Since the HEW AP can determine whether the received frame is transmitted from same BSS or different BSS, the HEW AP can continue to perform the channel access mechanism by increasing the CCA sensitivity level.

If bits for HEW-SIG-A field are not sufficient to define the 3-bit COLOR field, a part of 12-bit $N_{STS}$ field may be set to the 3-bit COLOR field. The $N_{STS}$ field indicates the number of space time streams transmitted to each of up to 4 STAs. For each STA, 3 bits indicate 0 space time streams, 1 space time stream, 2 space time streams, 3 space time streams, and 4 space time streams. However, in order to define the COLOR field, the number of destination STAs of the MU-MIMO frame may be limited to up to 3, and subsequently, last 3 bits of $N_{STS}$ field may be used as the COLOR field. The COLOR indication field may indicate whether the COLOR field is present in the HEW-SIG-A field. When the VHT AP transmits the MU-MIMO frame to the VHT STA, the COLOR indication field value is set to 1, and thus the HEW STA which overhears the MU-MMO frame does not acquire any COLOR information from the $N_{STS}$ field of the MU-MIMO frame. This is because the VHT AP corresponding to the legacy AP allocates the group ID and the $N_{STS}$ to the STA in the conventional way without considering the COLOR value.

Figure 10:
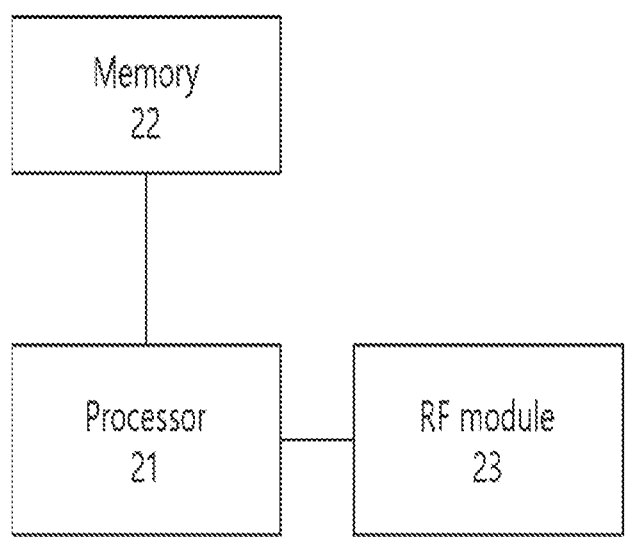
FIG. 10 is a block diagram of an STA according to an embodiment of the present invention.

FIG. 10 is a block diagram of an STA according to an embodiment of the present invention.

The STA may include a processor 21, a memory 22, and a Radio Frequency (RF) module 23.

The processor 21 implements an operation of the STA according to the embodiment of the present invention. The processor 21 may generate a PPDU according to an embodiment of the present invention and may instruct the RF module 23 to transmit the PPDU. The memory 22 stores instructions for the operation of the processor 21. The stored instructions may be executed by the processor 21 and may be implemented to perform the aforementioned operation of the STA. The RF module 23 transmits and receives a radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for communicating in a wireless local area network, the method comprising:
    broadcasting, by a first access point (AP), communication, the communication including a color indication and a first color value, the color indication having a value, the first color value identifying at least one basic service set (BSS) managed by the first AP; and
    transmitting, by the first AP, a physical layer protocol data unit (PPDU) to a receiving station,
    wherein the PPDU comprises a signal field, the signal field including a partial association identifier (AID) identifying the receiving station, the partial AID including, when the color indication has a first value, a second color value;
    wherein the second color value matches the first color value thereby allowing the receiving station to associate the PPDU with the first AP.

2. The method of claim 1, wherein the first color value has a predetermined value for all basic service sets (BSS's) managed by the first AP.

3. The method of claim 1 wherein the second color value is included in most significant bits (MSBs) of the partial AID.

4. The method of claim 1 wherein when the color indication has a second value, the partial AID does not include the second color value.

5. The method of claim 1 wherein the communication from the first AP further comprises at least one basic service set identifier (BSSID) uniquely identifying a BSS managed by the first AP; wherein the BSSID is represented by 48 bits; and the first color value is represented by less than 48 bits.

6. The method of claim 1 further comprising a step of transmitting, by the first AP, a PPDU, the PPDU lacking a second color value when the color indication has a second value.

7. A device configured for communicating in a wireless local area network, the device comprising:
    a radio frequency module configured to receive radio signals;
    a processor operatively coupled with the radio frequency module; and
    memory disposed to said processor, said memory comprising instructions that, when executed by said processor, causes the device to:
    broadcast communication, the communication including a color indication and a first color value, the color indication having a value, the first color value identifying at least one basic service set (BSS) managed by the device; and
    transmit a physical layer protocol data unit (PPDU) to a receiving station,
    wherein the PPDU comprises a signal field, the signal field including a partial association identifier (AID) identifying the receiving station, the partial AID including, when the color indication has a first value, a second color value;
    wherein the second color value matches the first color value thereby allowing the receiving station to associate the PPDU with the first AP.

8. The device of claim 7, wherein the first color value has a predetermined value for all basic service sets (BSS's) managed by the first AP.

9. The device of claim 7 wherein the second color value is included in most significant bits (MSBs) of the partial AID.

10. The device of claim 7 wherein when the color indication has a second value, the partial AID does not include the second color value.

11. The device of claim 7 wherein the communication further comprises at least one basic service set identifier (BSSID) uniquely identifying a BSS managed by the first AP; wherein the BSSID is represented by 48 bits; and the first color value is represented by less than 48 bits.

12. The device of claim 7 wherein the memory further comprises instructions that causes the device to transmit a PPDU, the PPDU lacking a second color value when the color indication has a second value.

* * * * *